(12) United States Patent
Roby et al.

(10) Patent No.: US 7,770,396 B2
(45) Date of Patent: Aug. 10, 2010

(54) SYSTEM FOR VAPORIZATION OF LIQUID FUELS FOR COMBUSTION AND METHOD OF USE

(75) Inventors: Richard J. Roby, Columbia, MD (US); Michael S. Klassen, Columbia, MD (US); Christopher F. Schemel, Laurel, MD (US)

(73) Assignee: LLP Combustion, LLC, Columbia, MD (US)

( * ) Notice: Subject to any disclaimer, the term of this patent is extended or adjusted under 35 U.S.C. 154(b) by 38 days.

(21) Appl. No.: 11/929,675

(22) Filed: Oct. 30, 2007

(65) Prior Publication Data

US 2008/0115502 A1 May 22, 2008

Related U.S. Application Data

(60) Continuation of application No. 11/464,441, filed on Aug. 14, 2006, now Pat. No. 7,322,198, which is a division of application No. 10/682,408, filed on Oct. 10, 2003, now Pat. No. 7,089,745.

(60) Provisional application No. 60/430,653, filed on Dec. 4, 2002, provisional application No. 60/417,184, filed on Oct. 10, 2002.

(51) Int. Cl.
  *F02C 1/00* (2006.01)
(52) U.S. Cl. .......................................... 60/737; 60/776
(58) Field of Classification Search .................. 60/737, 60/783, 772; 431/12
  See application file for complete search history.

(56) References Cited

U.S. PATENT DOCUMENTS

| | | | |
|---|---|---|---|
| 1,544,607 | A | 7/1925 | Henry |
| 2,268,603 | A | 1/1942 | Linder |
| 3,568,934 | A | 3/1971 | Dunn |
| 3,597,134 | A | 8/1971 | Bailey |
| 3,840,321 | A | 10/1974 | Moenchi |

(Continued)

FOREIGN PATENT DOCUMENTS

DE   101 27 043   6/2001

(Continued)

OTHER PUBLICATIONS

Cowell, et al., "Development of a Dual-Fuel Injection System for Lean Premixed Industrial Gas Turbines," American Society of Mechanical Engineers (Paper), 1996, ASME, New York, NY, Compendex, vol. 39, compendex only 1 page.

(Continued)

*Primary Examiner*—William H Rodriguez
(74) *Attorney, Agent, or Firm*—DLA Piper LLP (US)

(57) ABSTRACT

A gas stream with a reduced oxygen concentration relative to ambient air is used to vaporize a liquid fuel or liquefied higher hydrocarbon gas, or is mixed with a vaporized gas, and the reduced oxygen vaporized fuel gas is fed to a combustion device such as a premixed or diffusion combustor. Preferably, the oxygen content of the gas stream is less than the limiting oxygen index. By mixing the fuel with a gas stream that has an appropriately reduced oxygen content, auto-ignition prior to the desired flame location in the combustor can be avoided. In some embodiments, the reduced oxygen stream is generated from an air separator or taken from the exhaust of the combustion device.

18 Claims, 14 Drawing Sheets

U.S. PATENT DOCUMENTS

| | | | |
|---|---|---|---|
| 3,847,534 A | 11/1974 | Nomaguchi et al. | |
| 3,937,008 A | 2/1976 | Markowski et al. | |
| 3,973,395 A | 8/1976 | Markowski et al. | |
| 4,013,396 A | 3/1977 | Tenney | |
| 4,019,314 A | 4/1977 | Springmann | |
| 4,025,282 A | 5/1977 | Reed et al. | |
| 4,033,725 A | 7/1977 | Reed et al. | |
| 4,045,956 A | 9/1977 | Markowski et al. | |
| 4,058,977 A | 11/1977 | Markowski et al. | |
| 4,099,382 A * | 7/1978 | Paull et al. | 60/648 |
| 4,148,599 A | 4/1979 | Reed et al. | |
| 4,173,254 A * | 11/1979 | Paull et al. | 165/134.1 |
| 4,250,704 A | 2/1981 | Bruckner et al. | |
| 4,289,475 A | 9/1981 | Wall et al. | |
| 4,295,821 A | 10/1981 | Schilling | |
| 4,443,180 A | 4/1984 | LeFrois | |
| 4,483,832 A | 11/1984 | Schirmer | |
| 4,588,375 A | 5/1986 | Sandstrom | |
| 4,659,743 A | 4/1987 | Rao et al. | |
| 4,697,415 A | 10/1987 | Schiffers | |
| 4,729,217 A | 3/1988 | Kehlhofer | |
| 4,784,599 A | 11/1988 | Garbo | |
| 4,907,565 A | 3/1990 | Bailey et al. | |
| 4,909,728 A | 3/1990 | Nakamoto et al. | |
| 5,156,002 A | 10/1992 | Mowill | |
| 5,165,224 A | 11/1992 | Spadaccini et al. | |
| 5,207,053 A | 5/1993 | Spadaccini et al. | |
| 5,346,391 A | 9/1994 | Fullemann et al. | |
| 5,359,847 A | 11/1994 | Pillsbury et al. | |
| 5,377,483 A | 1/1995 | Mowill | |
| 5,388,395 A | 2/1995 | Scharpf et al. | |
| 5,394,686 A * | 3/1995 | Child et al. | 60/780 |
| 5,410,869 A | 5/1995 | Muller | |
| 5,417,053 A | 5/1995 | Uji | |
| 5,459,994 A | 10/1995 | Drnevich | |
| 5,464,344 A | 11/1995 | Hufton | |
| 5,473,882 A | 12/1995 | Zarzalis et al. | |
| 5,481,866 A | 1/1996 | Mowill | |
| 5,572,861 A | 11/1996 | Shao | |
| 5,713,195 A | 2/1998 | Bronicki et al. | |
| 5,740,673 A | 4/1998 | Smith et al. | |
| 5,775,091 A | 7/1998 | Bannister et al. | |
| 5,794,431 A | 8/1998 | Utamura et al. | |
| 5,806,298 A | 9/1998 | Klosek et al. | |
| 5,848,885 A | 12/1998 | Tanaka et al. | |
| 5,901,547 A | 5/1999 | Smith et al. | |
| 5,979,183 A | 11/1999 | Smith et al. | |
| 6,039,261 A | 3/2000 | Pavese | |
| 6,145,294 A | 11/2000 | Traver et al. | |
| 6,167,691 B1 | 1/2001 | Yoshikawa et al. | |
| 6,170,264 B1 | 1/2001 | Viteri et al. | |
| 6,174,160 B1 | 1/2001 | Lee et al. | |
| 6,200,128 B1 | 3/2001 | Kobayashi | |
| 6,220,034 B1 | 4/2001 | Mowill | |
| 6,282,901 B1 | 9/2001 | Marin et al. | |
| 6,341,486 B2 | 1/2002 | Hannemann et al. | |
| 6,343,462 B1 | 2/2002 | Drnevich et al. | |
| 6,350,116 B1 | 2/2002 | Herrmann | |
| 6,408,612 B2 | 6/2002 | Hannemann et al. | |
| 6,430,915 B1 | 8/2002 | Wiant et al. | |
| 6,434,925 B2 | 8/2002 | Hannemann et al. | |
| 6,508,053 B1 | 1/2003 | Ha et al. | |
| 6,588,212 B1 | 7/2003 | Wallace et al. | |
| 6,596,780 B2 | 7/2003 | Jahnke et al. | |
| 6,718,794 B2 | 4/2004 | Brugerolle et al. | |
| 6,779,333 B2 | 8/2004 | Gerhold | |
| 6,910,335 B2 | 6/2005 | Viteri et al. | |
| 6,928,821 B2 | 8/2005 | Gerhold | |
| 6,932,594 B2 | 8/2005 | Weclas et al. | |
| 6,978,619 B2 | 12/2005 | Blomeyer | |
| 2003/0131582 A1 | 7/2003 | Anderson et al. | |
| 2004/0065088 A1 | 4/2004 | Viteri et al. | |
| 2004/0134194 A1 | 7/2004 | Roby et al. | |
| 2004/0177617 A1 | 9/2004 | Frutschi et al. | |
| 2004/0247499 A1 | 12/2004 | Matsuoka et al. | |
| 2006/0127827 A1 * | 6/2006 | Yoshida et al. | 431/8 |
| 2007/0125091 A1 | 6/2007 | Roby et al. | |

FOREIGN PATENT DOCUMENTS

| | | |
|---|---|---|
| EP | 0 575 043 | 12/1993 |
| JP | 56-160515 | 12/1981 |
| JP | 06-058508 | 3/1994 |
| JP | 06-265146 | 9/1994 |
| JP | 11-30423 | 2/1999 |
| JP | 11-51312 | 2/1999 |
| WO | 90/08962 | 8/1990 |
| WO | WO 02/099334 | 12/2002 |

OTHER PUBLICATIONS

Davis, L.B., et al., "Dry Low NOx Combustion Systems for GE Heavy-Duty Gas Turbines," GE Power Systems, GER-3568G, Oct. 2000.

Gillispie, et al., "Effects of Fuel Gas Mixtures on Power Limits in a Dual-Fuel Engine," Natural Gas and Alternative Fuels for Engines American Society of Mechanical Engineers, Internal Combustion Engine Division (Publication) ICE, Compendex, vol. 30, compendex only 1 page.

Hoffmann, S., et al., "Further Development of the Siemens LPP Hybrid Burner," ASME-IGTI 98-GT-552, Stockholm, Sweden, Jun. 1998.

Lefebvre, A.H., "Gas Turbine Combustion," Emissions, Thermal Sciences and Propulsion Center School of Mechanical Engineering Purdue University, undated.

Stoffel, B., et al., "Conversion of Liquid to Gaseous Fuels for Lean Premixed Combustion," American Society of Mechanical Engineers (Paper), 1995, ASME, Presented at the International Gas Turbine and Aeroengine Congress and Exposition, Houston, Texas, Jun. 5-8, 1995.

Turns, S.R., "An Introduction to Combustion Concepts and Applications," Second Addition, Chapter I, Propulsion Engineering Research Center and Department of Mechanical and Nuclear Engineering, The Pennsylvania State University, McGraw Hill, undated.

Wei, et al., "Experimental Investigation of the Prevaporized Premised (vpl) Combustion Process for Liquid Fuel Lean Combustion," Chemical Engineering and Processing, vol. 41, pp. 157-164, 2002.

Malte, Philip C., et al., "The Staged Prevaporizing-Premixing Injector; High Pressure Evaluation", AGTSR Subaward No. 00-01-SR087, Final Report from the University of Washington, Dec. 2002.

Summary Health Statistics for U.S. Adults: National Health Interview Survey, Vital and Health Statistics, Series 10, No. 218, 2001.

Ahrens, Marty "The U.S. Fire Problem Overview Report Leading Causes and Other Patterns and Trends", NFPA, Fire Analysis and Research Division, Jun. 2003.

International Report on Patentability and Written Opinion issued in PCT/US2005/044414 dated Nov. 1, 2006.

International Search Report on issued in PCT/US2005/044414 dated Nov. 1, 2006.

Japanese Office Action mailed Jun. 16, 2009 in JP 2005-501180.

English Translation of Japanese Office Action mailed Jun. 16, 2009 in JP 2005-501180.

English Language Abstract of JP 11-051312 published Feb. 26, 1999.

Partial English Language Translation of JP 11-051312 published Feb. 26, 1999.

Machine English Language Translation of JP 11-051312 published Feb. 26, 1999.

English Language Abstract of JP 56-160515 published Dec. 10, 1981.

English Translation of Chinese Office Action dated Nov. 17, 2006 issued in counterpart CN 200380105739.9.

Chinese Office Action dated Nov. 17, 2006 issued in counterpart CN 200380105739.9.

Australian Office Action dated Nov. Oct. 29, 2008 issued in counterpart AU 2003284124.

Canadian Office Action issued in counterpart CA 2,501,882.

English Translation of Korean Office Action dated Jun. 29, 2007 issued in counterpart KR 10-2005-7006266.

Korean Office Action dated Jun. 29, 2007 issued in counterpart KR 10-2005-7006266.

Chinese Office Action dated Jun. 5, 2009 issued in counterpart CN 200710166824.6.

English Translation of Chinese Office Action dated Jun. 5, 2009 issued in counterpart CN 200710166824.6.

Chinese Office Action dated Feb. 6, 2009 issued in counterpart CN 200580041555.X.

English Translation of Chinese Office Action dated Feb. 6, 2009 issued in counterpart CN 20058004155.X.

International Preliminary Report on Patentability issued Mar. 10, 2008 in related PCT/US2007/067891.

International Search Report and Written Opinion issued Mar. 10, 2008 in related PCT/US2007/067891.

Notice of Allowance issued Mar. 21, 2006 in U.S. Appl. No. 10/682,408.

Office Action issued Nov. 3, 2005 in U.S. Appl. No. 10/682,408.

Final Office Action issued Oct. 3, 2007 in U.S. Appl. No. 11/464,441.

Office Action issued May 7, 2007 in U.S. Appl. No. 11/464,441.

Notice of Allowance issued Nov. 9, 2007 in U.S. Appl. No. 11/464,441.

Office Action issued Mar. 5, 2007 in U.S. Appl. No. 11/296.426.

Final Office Action issued Apr. 16, 2009 in related U.S. Appl. No. 11/296,426.

Office Action issued Jun. 24, 2008 in reiated U.S. Appl. No. 11/296,426.

Internationai Search Report dated Aug. 17, 2004 issued in counterpart PCT/US2003/032423.

* cited by examiner

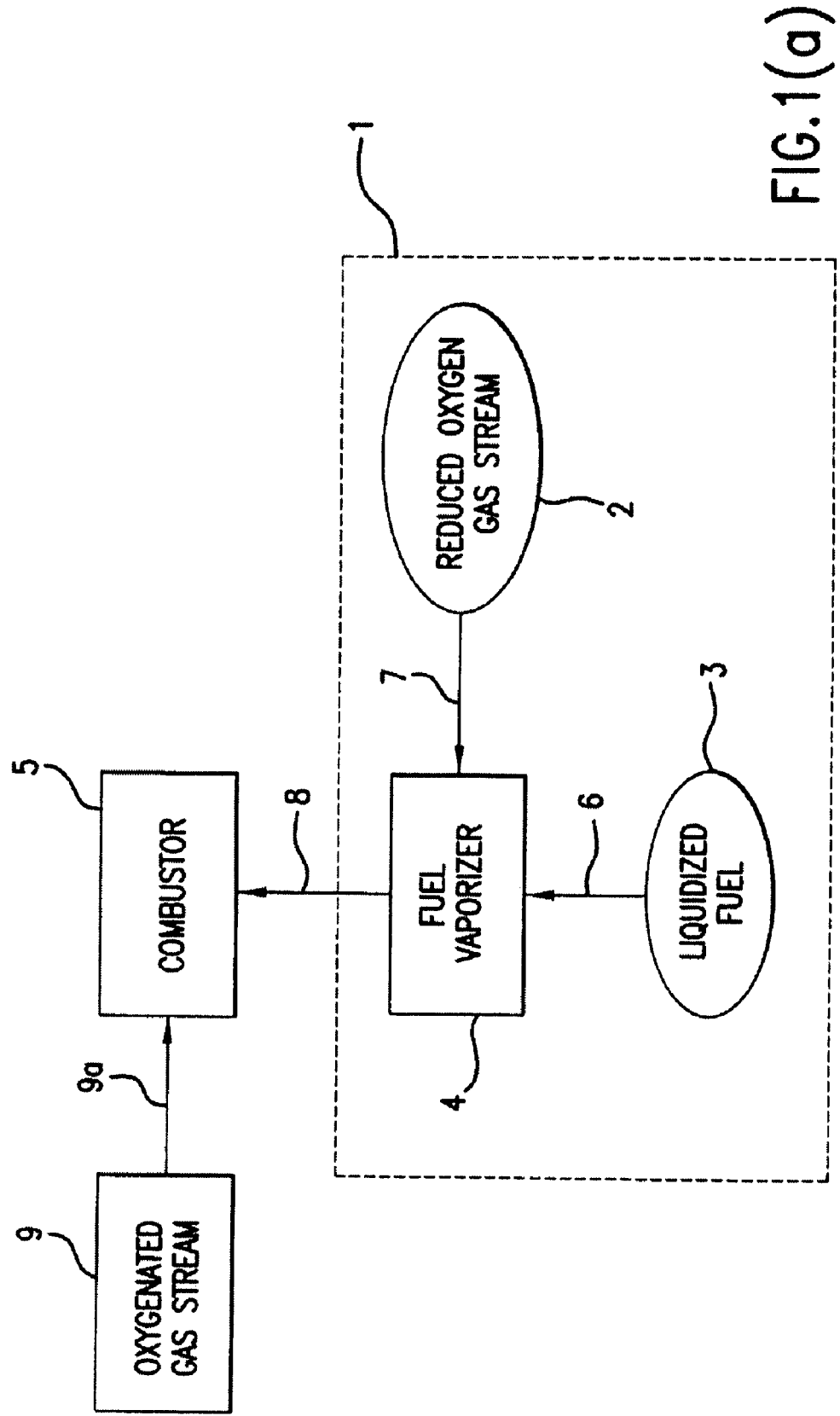

SYSTEM FOR VAPORIZATION OF LIQUID FUELS FOR COMBUSTION AND METHOD OF USE

This application is a continuation of U.S. application Ser. No. 11/464,441, filed Aug. 14, 2006, which is a divisional of U.S. application Ser. No. 10/682,408, filed Oct. 10, 2003, which claims priority to U.S. Provisional Application Ser. No. 60/417,184, filed Oct. 10, 2002; and U.S. Provisional Application No. 60/430,653, filed Dec. 4, 2002. The entireties of all of the aforementioned applications are incorporated herein by reference.

BACKGROUND

1. Field of the Invention

The present invention relates to methods and devices for suitably vaporizing, mixing, and delivering liquid fuels or liquefied gases for use in combustion devices.

2. Background of the Technology

Combustion devices, such as gas turbines used for power generation, are typically fueled by natural gas (e.g., compressed natural gas or CNG). Typically, natural gas consists of approximately 90-98% by volume methane ($CH_4$), although some gases with as little as 82% methane have been characterized as natural gas. Other than methane, natural gas may include $CO_2$, $O_2$, $N_2$ and higher hydrocarbon gases, such as C2 (ethane, ethylene, acetylene), C3 (propane), C4 (butane), and C5 (pentane).

Recent advances in the design of the combustion systems for gas turbine engines have resulted in substantial improvements in exhaust emissions during operation on natural gas through the use of lean, premixed combustion. In this combustion mode, natural gas is premixed with combustion air prior to arrival at the flame front. This lean mixture of natural gas and air burns at a lower temperature than conventional diffusion flame combustors, thereby producing lower levels of pollutants, including oxides of nitrogen ($NO_x$) in the exhaust stream. By way of example, the maximum allowable $NO_x$ levels for diffusion flame combustors is typically 42 ppm @ 15% $O_2$, while the maximum allowable $NO_x$ levels for a lean, premixed combustion gas turbine is now typically 15 ppm @ 15% $O_2$. The 42 ppm $NO_x$ level for diffusion flame combustors generally can only be achieved through the addition of large amounts of steam or water into the combustor to reduce the flame temperature.

Attempts have been made to operate lean, premixed combustion devices with alternate, higher hydrocarbon liquid fuels such as oil and diesel fuel and higher hydrocarbon fuel gases such as propane (C3), and butane (C4). As used herein, "higher hydrocarbon fuel" refers to a fuel wherein at least 50 weight percent of the hydrocarbon molecules of the fuel have at least two carbon atoms. Unfortunately, these combustion devices cannot be readily operated in a lean, premixed, pre-vaporized (LPP) combustion mode when using the alternate liquid fuels. In order to generate a lean, premixed, prevaporized flame using liquid fuels or liquefied gases (as used herein, the term "liquid fuel" should be understood to include fuels that are normally in a liquid state at room temperature and atmospheric pressure, as well as gases that have been liquefied by cooling and/or pressurizing), the liquids must first be evaporated into a carrier gas (normally air) to create a fuel gas (i.e. a fuel vapor/air mixture) which then may be mixed with additional combustion air prior to arrival at the flame front. However, a phenomenon known as auto-ignition can occur with such vaporized liquid fuel/liquefied gas and air mixtures. Auto-ignition is the spontaneous ignition of the fuel prior to the desired flame location in the combustion device. This premature ignition can occur, for example, as a result of normal, premature, or other heating of the fuel that can occur as the fuel is fed to the combustion device. Auto-ignition results in decreased efficiency and damage to the combustion device, shortening the useful life of the combustion device and/or causing an increase in unwanted emissions.

Various attempts have been made to curtail auto-ignition of higher hydrocarbon liquid fuels in such lean, premixed combustion devices, but none of them have proven entirely successful. As a result, "dual fuel" combustion devices, such as gas turbines, capable of operating with both natural gas and higher hydrocarbon liquid fuels typically operate in a lean, premixed mode when used with natural gas and in a diffusion mode when used with higher hydrocarbon liquid fuels. Combusting the liquid fuels in the diffusion mode is undesirable as it increases $NO_x$ and other emissions as compared to natural gas combusted in the lean, premixed mode.

Another issue that has recently become of increased importance is a problem associated with the use of liquefied natural gas. A recent shortage in the domestic natural gas supply has made the importation of liquefied natural gas more common. When liquefied natural gas is shipped, typically via tanker, the higher hydrocarbon gases have a higher boiling point. When the liquid natural gas is re-vaporized for use as a gaseous fuel, the last portion of liquefied natural gas removed from the storage container contains a higher percentage of higher hydrocarbon fuels. Due to the aforementioned auto-ignition problem, this portion of the liquefied natural gas cannot be used in many existing lean, premixed natural gas combustors.

Combustion devices similar to those used with natural gas are also used on boilers, incinerators, and turbine engines, and other combustion engines, including applications other than power generation, such as for propulsion for naval ships. Problems with use of turbine engines for naval ships include the large amount of storage space typically required for conventional compressed gas fuel and high emissions that result from alternative fuel use in conventional turbine engines. The emissions can both violate environmental requirements and present a security hazard by, for example, producing visible emissions that reveal the position of the vessel.

There remains an unmet need for combustion devices such as turbine engines and other combustion devices that can be operated with both natural gas and higher hydrocarbon liquid fuels in a lean, premixed, pre-vaporized mode. A satisfactory dual fuel option for such combustion devices would allow, for example, cost and fuel flexibility for applications such as power generation and others.

SUMMARY

Embodiments of the present invention address the aforementioned issues, as well as others, to a great extent by providing a mechanism for producing pre-vaporized fuel gas with a reduced oxygen content relative to ambient air from a wide variety of liquid fuels or liquefied gases, which can be fed into a combustion device as a gaseous fuel. In preferred embodiments, the pre-vaporized fuel gas can be used with existing lean, premixed combustion devices configured to combust natural gas. Such a gaseous fuel feed is usable with turbine engines and diesel and gasoline engines, such as to power naval vessels, locomotives, aircraft, and automobiles. The invention is also usable with a wide range of other combustion devices, especially for combustion devices for which a high degree of ignition and/or emissions control is desired. For example, $NO_x$ reductions can be achieved using the invention even with diffusion flame combustors. This emissions reduction is achieved as a result of the added heat capacity of the reduced oxygen stream/fuel gas mixture, since the additional inert gas serves to reduce flame temperature, thus reducing $NO_x$.

In an embodiment of the present invention, an inert gas stream or other gas stream with a reduced oxygen concentration relative to air is used to vaporize a liquid fuel or liquefied higher hydrocarbon natural gas, and the reduced oxygen vaporized fuel gas is fed to a combustion device. By mixing the fuel with a gas stream that has an appropriately reduced concentration of oxygen, reaction of the vaporized fuel can be prevented or sufficiently delayed so as to avoid auto-ignition. A high degree of ignition control, as well as other features of the present invention, as described further below, are usable to reduce or otherwise control emissions or combustion instabilities.

A number of devices or systems known in the art may be used to supply the inert gas stream, and a number of inert gases may be used in conjunction with the present invention. For example, in one embodiment of the present invention, vitiated exhaust gas from a pre-burner or from downstream of the combustion device can provide a reduced oxygen stream for vaporization of the liquid fuel or liquefied gas for use that avoids auto-ignition. By appropriately conditioning this exhaust gas stream, the stream can be used to vaporize any of a variety of liquid fuels or liquefied gases, which, once appropriately processed and mixed with the exhaust gas stream, can be fed directly into a combustion device as a gaseous fuel. In another embodiment of the present invention, an air separator unit supplies the reduced oxygen gas stream to the liquid fuel or liquefied gas vaporizer.

Advantageously, this allows for a self-contained unit for producing a pre-vaporized fuel from any of a variety of liquid fuels or liquefied gases and compressed air, which, once appropriately processed and mixed, can be fed directly into an existing turbine engine adapted to combust natural gas. This mixture can then be burned in a lean, premixed flame in order to improve engine performance. For example, such improvements may include, but are not limited to, improved exhaust emissions and/or greater flame stability, including reduced combustion device dynamics.

An air separator unit for use in embodiments of the present invention separates oxygen and nitrogen from air. The output of the air separator includes two gas streams, a first stream that has increased oxygen and reduced nitrogen ("the oxygen-rich stream") relative to air, and a second stream that has reduced oxygen and increased nitrogen relative to air (the resulting reduced oxygen stream of this embodiment, as well as the otherwise reduced oxygen streams of other embodiments, are referred to interchangeably as "the oxygen-reduced stream" or "the reduced oxygen stream"). In one embodiment of the present invention, the air separator produces the streams using a process referred to in the art as "adsorption."

The oxygen-reduced stream may then be combined with vaporized liquid fuel or liquefied gas before being fed to the combustion device. Because vaporized fuel requires a sufficient presence of oxygen in order to combust, by mixing the vaporized fuel with an oxygen-reduced stream, such as an appropriate level of non-combustible nitrogen combined with a reduced level of oxygen, combustion of the vaporized fuel can be prevented or sufficiently delayed so as to avoid auto-ignition. The combined fuel and oxygen-reduced stream may then be fed as a gaseous fuel into the combustion device, where the fuel/oxygen-reduced stream may be mixed with an oxygen source (e.g., intake air) for combustion in the engine.

In an embodiment of the present invention, the air separator uses compressed air fed from the turbine compressor. Alternatively or additionally, the air separator may use compressed air from any compressed air source.

In one embodiment of the present invention, the oxygen-rich stream produced by the air separator may be fed to the combustion device downstream of fuel burning in order to reduce emissions from the turbine engine. The feeding of an oxygen rich stream into the post-combustion emission stream can reduce the pollutants produced by the combustion device by, for example, enhancing the oxidation of unburned fuel and/or carbon monoxide in the exhaust stream.

In one embodiment of the present invention, the oxygen-rich stream produced by the air separator may be fed to the combustion device to widen the operating range of the combustion device.

Many liquid hydrocarbon fuels are usable with the present invention. Such liquid fuels or liquefied gases include but are not limited to, diesel fuel, #2 heating oil, gasoline, liquefied natural gas with elevated higher hydrocarbon content, other liquefied gases including liquefied C2, C3, C4, C5, etc., and flammable liquid waste streams, such as waste streams produced by manufacturing processes.

In one embodiment of the present invention, the heating value on a mass or volumetric basis of the fuel gas stream may be controlled by mixing an appropriate proportion of the reduced-oxygen stream. This facilitates supplying the fuel gas to the combustion device through, for example, an existing natural gas fuel system.

Additional advantages and novel features of the invention will be set forth in part in the description that follows, and in part will become more apparent to those skilled in the art upon examination of the following or upon learning by practice of the invention.

DESCRIPTION OF THE FIGURES

FIG. 1(a) is a block diagram of an embodiment of the present invention;

DETAILED DESCRIPTION

Figure 1B:
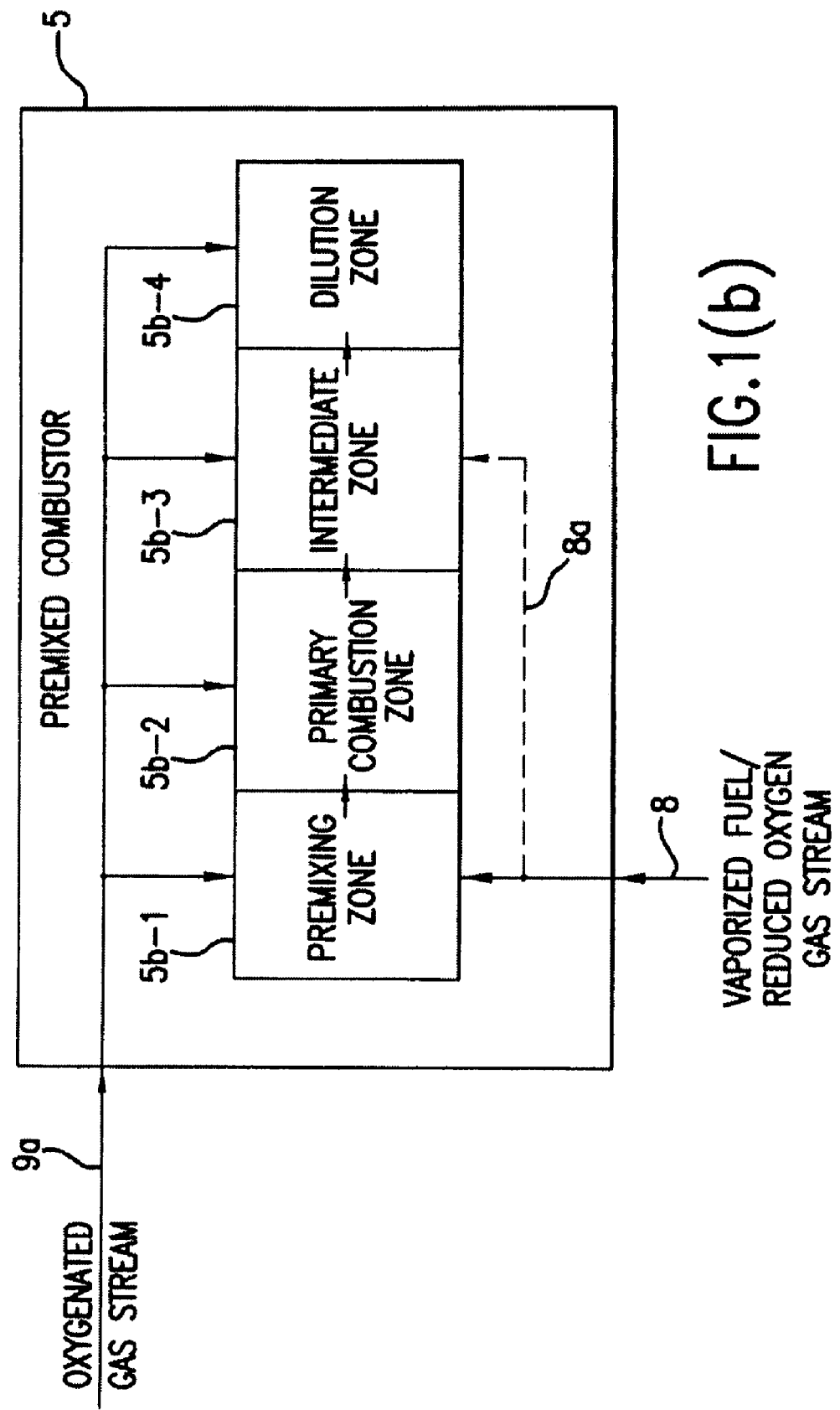
FIGS. 1(b) and 1(c) are block diagrams of different types of combustors suitable for use in the embodiment of FIG. 1(a)

The present invention will be discussed with reference to preferred embodiments of combustion systems. Specific details, such as types of fuels and oxygen contents of gas streams, are set forth in order to provide a thorough understanding of the present invention. The preferred embodiments discussed herein should not be understood to limit the invention. Furthermore, for ease of understanding, certain method steps are delineated as separate steps; however, these steps should not be construed as necessarily distinct nor order dependent in their performance.

As used herein, "vaporizing" should be understood to be distinct from "gasifying." Gasifying is a term of art that refers to a process by which a non-gaseous fuel such as coal is converted into a gaseous fuel by partially reacting (e.g., burning) the non-gaseous fuel with ambient air or an oxygen-enriched gas stream. In contrast, reaction of the liquid fuel is substantially suppressed during the vaporizing process according to the present invention due to the presence of a gas stream with reduced oxygen content relative to ambient air.

The invention is believed to be particularly applicable to lean, premixed, prevaporized combustion devices and therefore will be discussed primarily in that context herein. However, the invention should not be understood to be so limited. For example, the invention may also be practiced with RQL (rich quenched lean) combustion devices, partially premixed combustion devices, or with diffusion flame combustion devices.

Shown in FIG. 1(a) is a block diagram of a combustion system according to one embodiment of the invention including a typical combustor 5 (also referred to herein interchangeably as a "combustion device") for use with liquid fuels or liquefied gases for a combustor, such as, but not limited to, a turbine engine or a spark ignition or compression ignition engine. As shown in FIG. 1(a), a liquid fuel/liquefied gas vaporization unit 1 is connected to the combustor 5. A flow 8 of reduced oxygen vaporized fuel is provided to the combustor 5 from the vaporization unit 1. Also input to the combustor 5 is an oxygenated gas stream 9, such as a source of air. In one embodiment, the combustor 5 includes features for suitably mixing the vaporized fuel flow 8 and the flow of the oxygenated gas stream 9.

The vaporization unit 1 includes a reduced oxygen gas stream source 2, a liquid fuel/liquefied gas source 3 (also referred to herein interchangeably as "liquid fuel" and/or "liquidized fuel"), and a vaporizer unit 4. The liquid fuel/liquefied gas vaporization unit 4 mixes and vaporizes the supply streams 6, 7 from the liquid fuel/liquefied gas source 3 and the reduced oxygen gas stream source 2, respectively. Many different methods may be used to vaporize the liquid fuel stream 6 and the reduced oxygen gas stream 2. The order in which the mixing and vaporizing occurs is not important. In some embodiments, the mixing and the vaporization occur simultaneously, such as when the reduced oxygen stream is pre-heated to a temperature sufficient to vaporize the liquid fuel. In other embodiments, the liquid fuel stream 6 is partially or completely vaporized, e.g., by heating the liquid fuel, prior to mixing with the reduced oxygen gas stream 7. In some embodiments, the reduced oxygen gas stream 7 is pressurized and/or heated prior to mixing and vaporizing. The vaporized fuel stream 8, which has been conditioned to avoid auto-ignition by mixing with the oxygen-reduced stream, is then fed to the combustor 5 for use in the combustion process.

In some embodiments, the vaporized fuel stream 8 is at a temperature sufficiently high that the temperature of the vaporized fuel stream 8 remains above the dew point during transit to the combustor 5. In other embodiments, the temperature of the vaporized fuel stream 8 may fall below the dew point if the distance that the vaporized fuel stream 8 must travel to reach the combustor 5 is short enough such that there is insufficient time for significant amounts of condensation to occur. In yet other embodiments, the vaporized fuel stream 8 is heated between the vaporizer 4 and the combustor 5.

The reduced oxygen gas stream source 2 produces a gas stream with an oxygen content that is reduced relative to ambient air, which is commonly taken as containing approximately 21% $O_2$. In some embodiments of the invention, the reduced oxygen gas stream has an oxygen content below the limiting oxygen index. The limiting oxygen index (LOI) is the concentration of oxygen in the local environment below which a material will not support combustion and varies for different types of liquid fuels. The LOI is typically between about 10% and about 14% and is approximately 13% for many higher hydrocarbon fuels. The more the oxygen content of the gas stream from the source 2 is reduced, the more auto-ignition is suppressed. However, more work (i.e., energy) is required to produce a gas stream with a lower oxygen content. This work will reduce the overall efficiency of the system. Thus, in some embodiments, the oxygen content from the stream source 2 is just low enough to suppress auto-ignition by the required amount, which may be above or below the LOI. In other embodiments of the invention, the reduced oxygen gas stream source 2 contains no oxygen. In some of these embodiments, the gas supplied by reduced oxygen gas stream source 2 is inert; in yet other embodiments, the gas from source 2 contains hydrocarbons (e.g., methane and/or higher hydrocarbons).

The amount of reduction in oxygen content in the gas stream from the source 2 necessary to sufficiently suppress auto-ignition will depend upon the particular application and, in particular, upon factors such as the quality of the fuel, the mixing/vaporization scheme, the distance the vaporized gas stream must travel to reach the combustor, the heat of the vaporized gas stream as it leaves the vaporizer, the heat to which the reduced oxygen gas stream/fuel mixture is subjected in the combustor prior to combustion, and the distance from the pre-mixing zone to the combustion zone in the combustor.

Figure 1C:
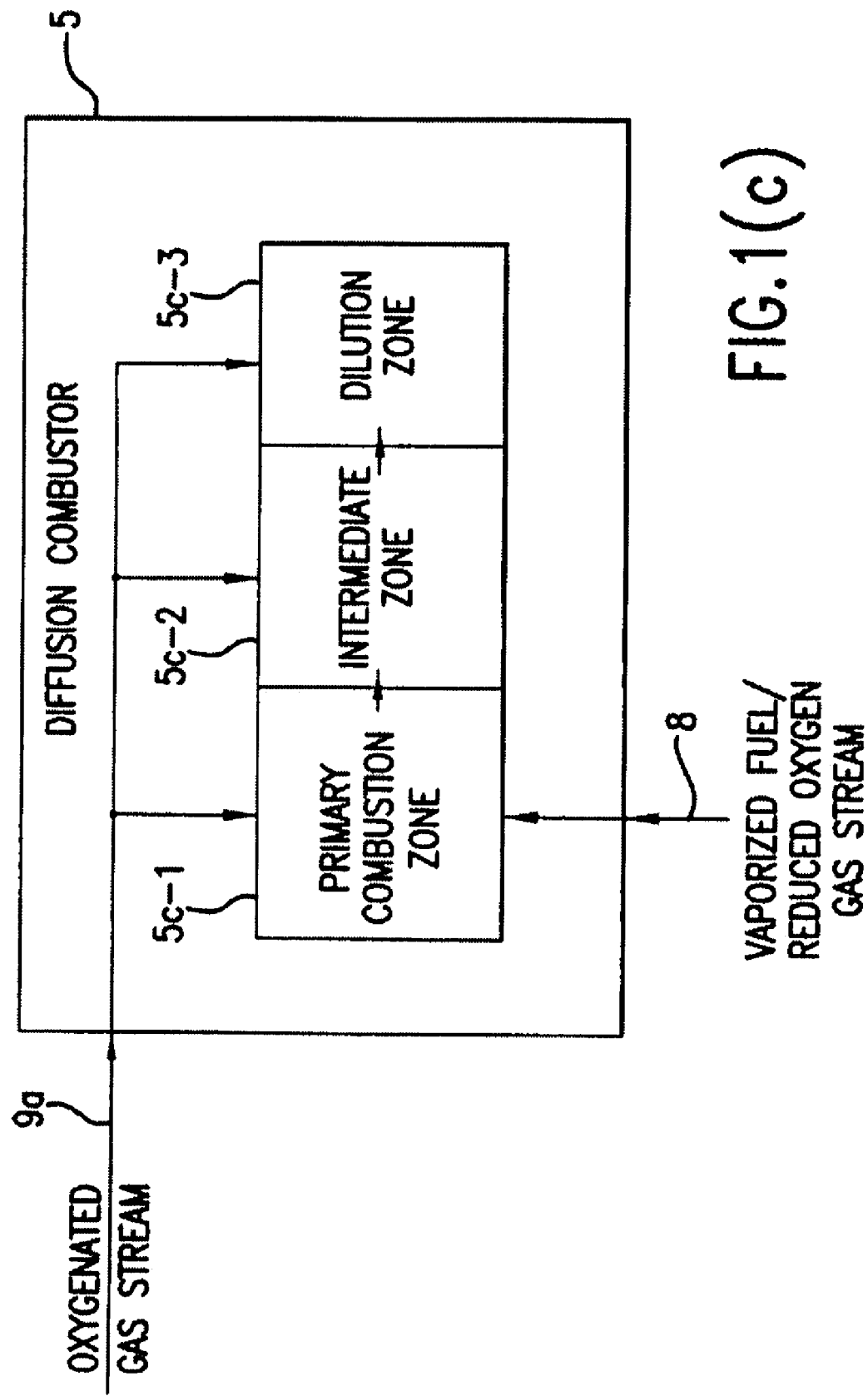

As discussed above, the combustor 5 of FIG. 1(a) may be a premixed combustor as shown in FIG. 1(b). Premixed combustors typically contain a premixing zone 5b-1, a primary combustion zone 5b-2, an intermediate zone 5b-3 and a dilution zone 5b-4. In a premixed combustor, the reduced oxygen vaporized fuel gas stream 8 is fed to the premixing zone 5b-1, where it is premixed with an oxygenated gas stream 9a (e.g., air). The oxygenated gas stream 9a is typically fed to some or all of the other zones 5b-2, 5b-3, 5b-4. In an RQL combustion device, the reduced oxygen vaporized fuel gas stream 8 is also fed to the intermediate zone 5b-3. Alternatively, the combustor 5 of FIG. 1(a) may be a diffusion combustor, as shown in FIG. 1(c), including a primary combustion zone 5c-1, an intermediate zone 5c-2, and a dilution zone 5c-3. In a typical diffusion combustor, the reduced oxygen vaporized fuel gas stream 8 is fed to the primary combustion zone 5c-1, where it is combusted in the presence of the oxygenated gas stream 9a.

Figure 2:
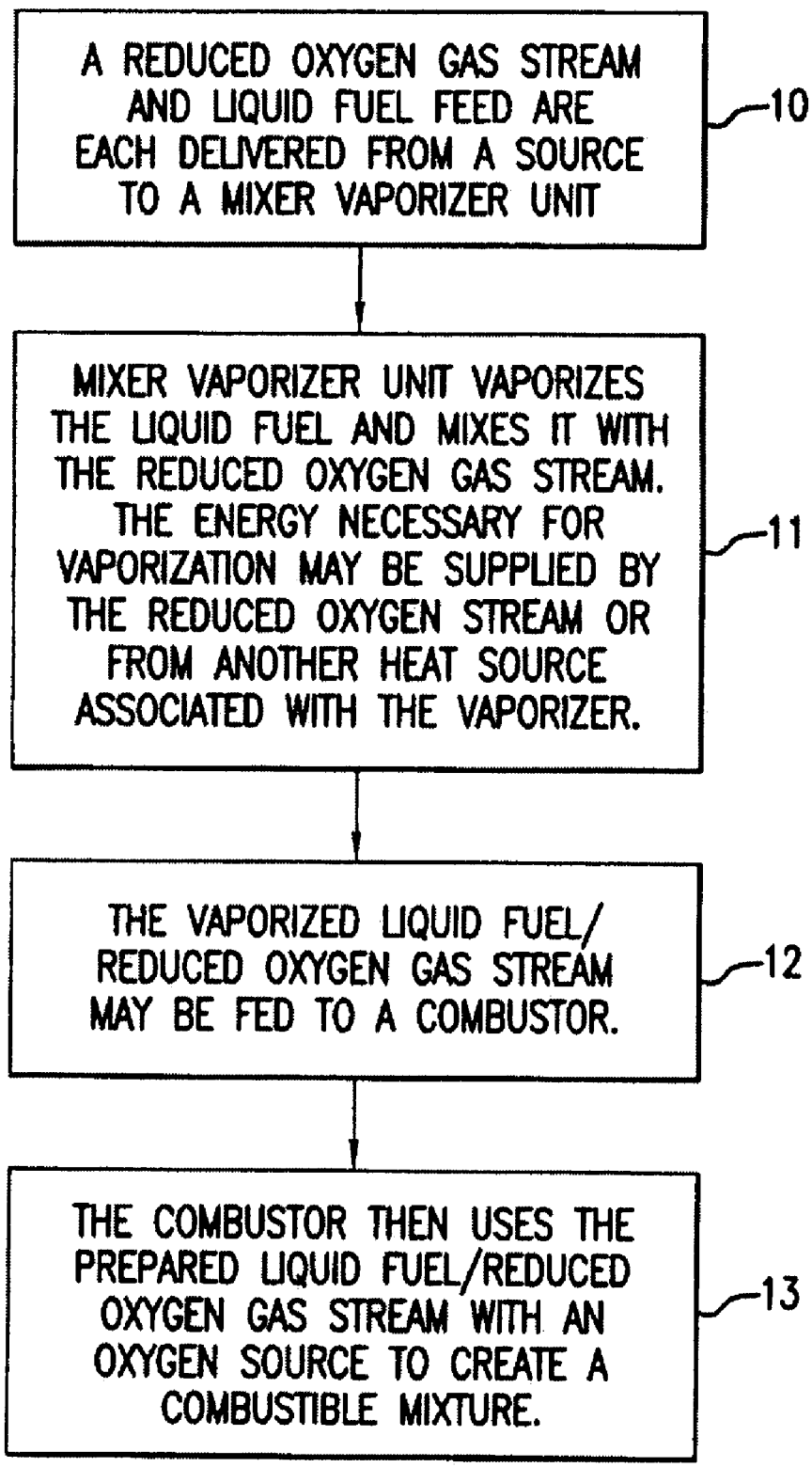
FIG. 2 shows a flow diagram of a method of using liquid fuels or liquefied gases and a combustion device, in accordance with an embodiment of the present invention.

FIG. 2 shows a flow chart of a method of operation of a liquid fuel/reduced oxygen gas vaporization system, in accordance with one exemplary embodiment of the present invention. A reduced oxygen gas stream and a feed from a liquid source fuel source are each supplied to the liquid fuel vaporization unit at step 10. The liquid fuel vaporization unit mixes and vaporizes the supply streams at step 11. The vaporization energy may be supplied by the reduced oxygen gas stream or from another energy source. The vaporized fuel stream, which has been conditioned to avoid auto-ignition by mixing with the oxygen-reduced stream, is then fed to a combustor at step 12. The combustor uses the prepared liquid fuel/reduced oxygen gas stream with an oxygen source to create a combustible mixture at step 13.

Figure 3:
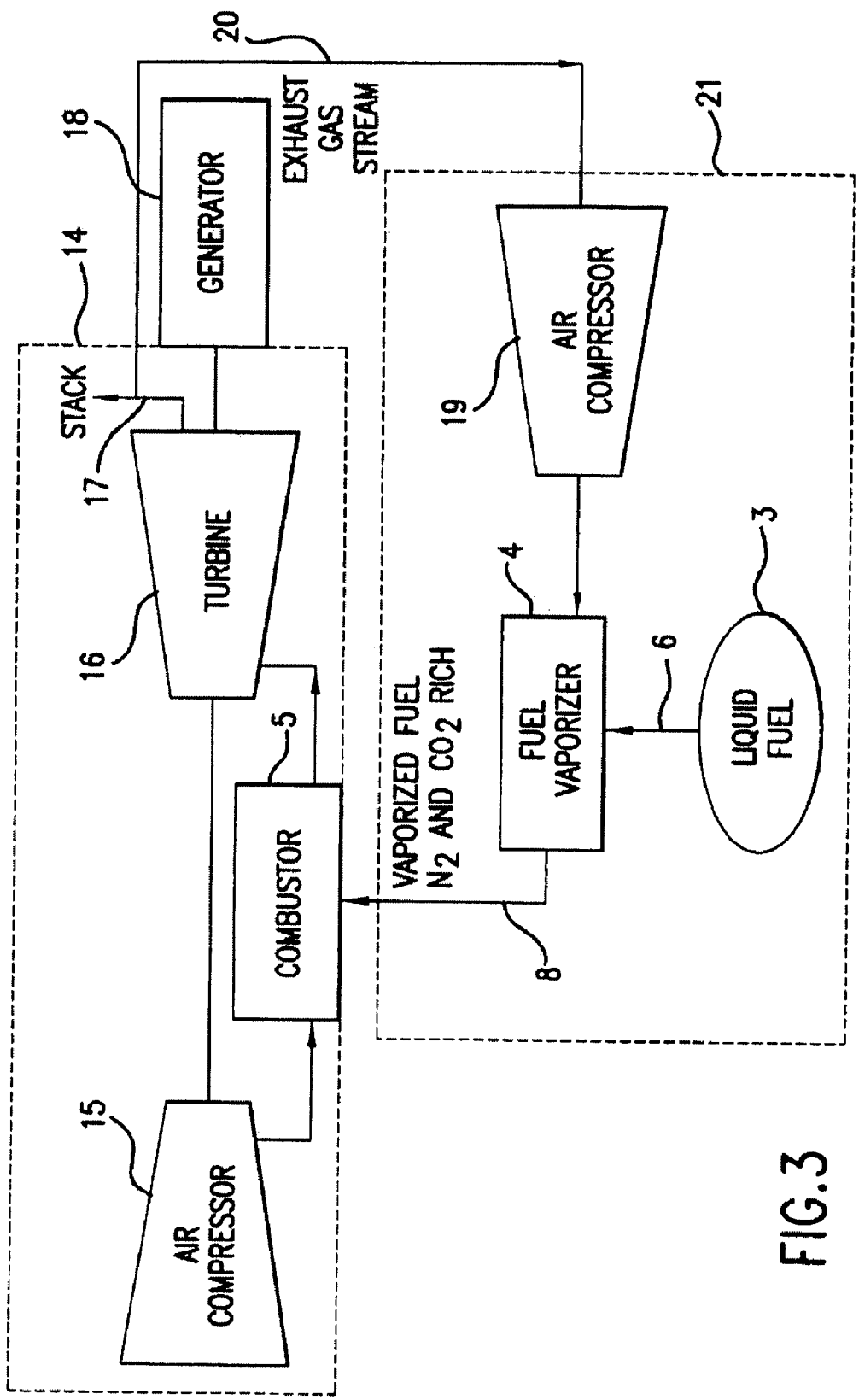
FIG. 3 is a block diagram of an example gas turbine engine with a liquid fuel or liquefied gas combustion device for use therewith, in accordance with an embodiment of the present invention.

Another embodiment of a combustion system according to the present invention is shown in FIG. 3. The combustion system of FIG. 3 includes a conventional gas turbine engine 14 having an air compressor 15 (connected to a combustion air supply, not shown in FIG. 3), a combustor 5 (which, as discussed above, may be a premixed or diffusion combustor), a turbine 16, and a stack 17 for emission release. The turbine engine 14 can be coupled to any device, e.g., to a generator 18 or other output, such as a naval vessel's screws. In this embodiment, a portion of the exhaust stream 20 from the stack 17 is used to supply the reduced oxygen gas stream to a liquid fuel/liquefied gas vaporization unit 21. The liquid fuel/liquefied gas vaporization unit 21 is connected to the conventional gas turbine engine 14. The vaporization unit 21 includes a compressor 19 to pressurize the stack exhaust stream 20, a fuel vaporizer 4, and a liquid fuel/liquefied gas source 3, which may be contained within the unit 21 or, alternatively, separate from and connected to the unit 21.

Figure 4:
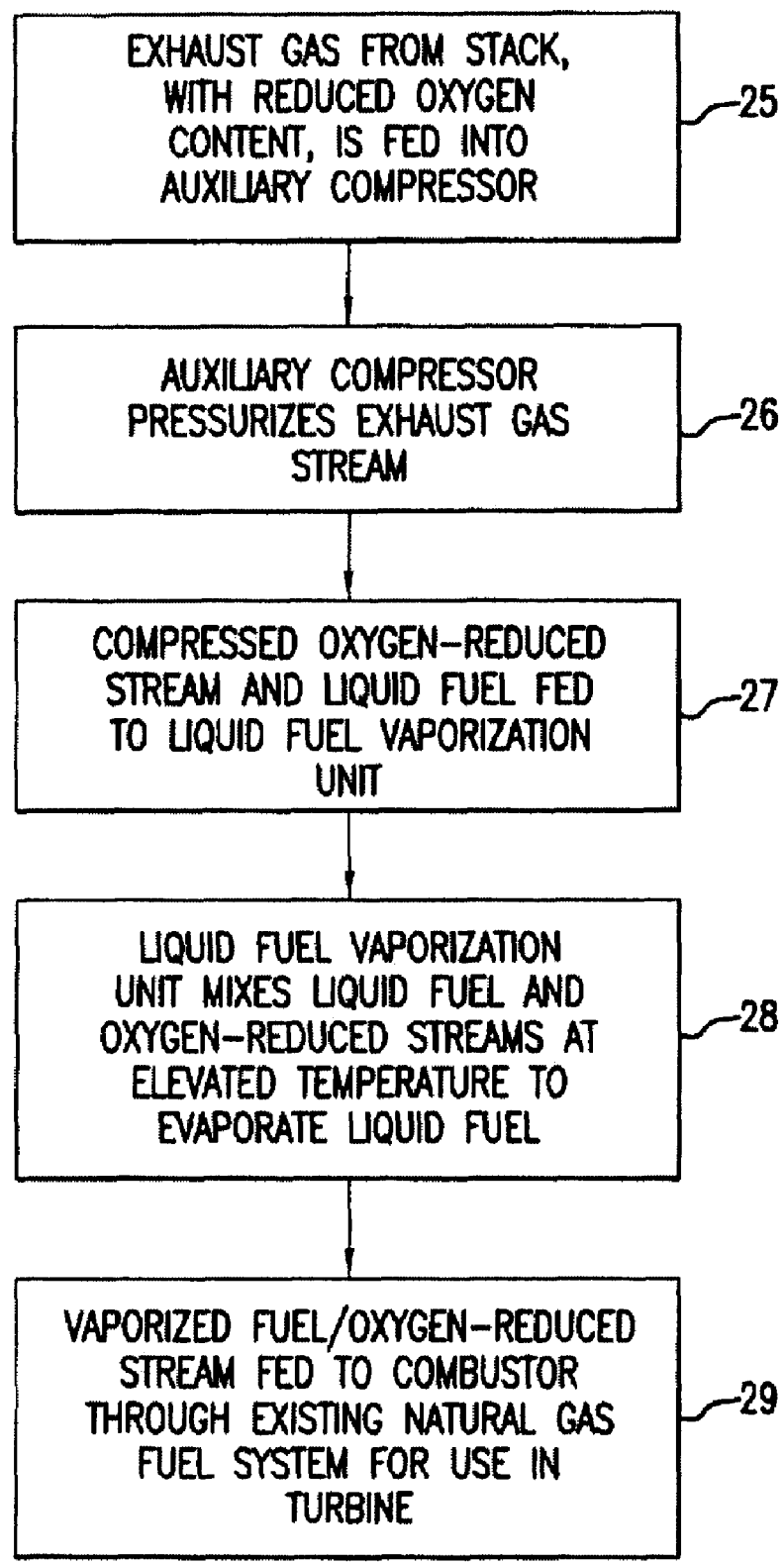
FIG. 4 shows a flow diagram of a method of using liquid fuels or liquefied gases with a gas turbine engine, in accordance with an embodiment of the present invention.

FIG. 4 shows a flow chart of one method of operation of a liquid fuel/reduced oxygen gas vaporization system for use with a turbine, in accordance with an embodiment of the present invention. The turbine exhaust stream, which has reduced-oxygen content, is fed to a compressor at step 25. The compressor pressurizes the gas turbine exhaust stream at step 26. The compressor output of the resulting oxygen-reduced stream and the liquid fuel stream are each fed to the liquid fuel vaporizer at step 27. The compressor output is mixed with the liquid fuel stream to vaporize the liquid fuel at step 28. The reduced oxygen vaporized liquid fuel stream is then fed to the combustor of the gas turbine at step 29.

In some preferred embodiments, the turbine engine 14 is an existing lean, premixed device configured to operate with natural gas, and the liquid fuel 3 is a higher hydrocarbon liquid fuel. In addition to the aforementioned auto-ignition problem, a second issue arises in connection with the use of higher hydrocarbon fuels in combustion devices configured to operate with natural gas—because higher hydrocarbon fuels have a higher energy content than natural gas, the fuel gas distribution and metering system of an engine configured to operate with natural gas would normally require modification to operate with a higher hydrocarbon fuel gas. However, in preferred embodiments, the gas vaporization unit 21 is configured to supply a reduced oxygen vaporized fuel gas to the turbine engine 14 such that no modification to the fuel gas distribution system of the engine 14 is necessary. This is accomplished by mixing an amount of reduced oxygen gas with the vaporized fuel such that the energy content of the reduced oxygen vaporized fuel gas from the vaporizer 4 is equivalent to natural gas. This may be done on a volumetric or mass basis, depending upon the fuel metering method used by the engine 14. In other embodiments, the energy content of the reduced oxygen fuel gas is higher or lower than that of natural gas and the fuel distribution system is configured to operate with such higher or lower energy content gas.

By way of example, the heating value of a fuel gas is approximately proportional to the number of carbon atoms in the gas molecule. Therefore, pentane ($C_5H_{12}$) has approximately 5 times the heating value of the primary component of natural gas, methane ($CH_4$). If liquefied pentane were used as the liquid fuel in the system of FIG. 3, the vaporizer 4 would be configured to output a fuel gas stream comprising one part vaporized pentane gas and four parts reduced oxygen gas for use with an engine 14 having a fuel gas distribution system configured for metering methane on a volumetric basis.

Figure 5A:
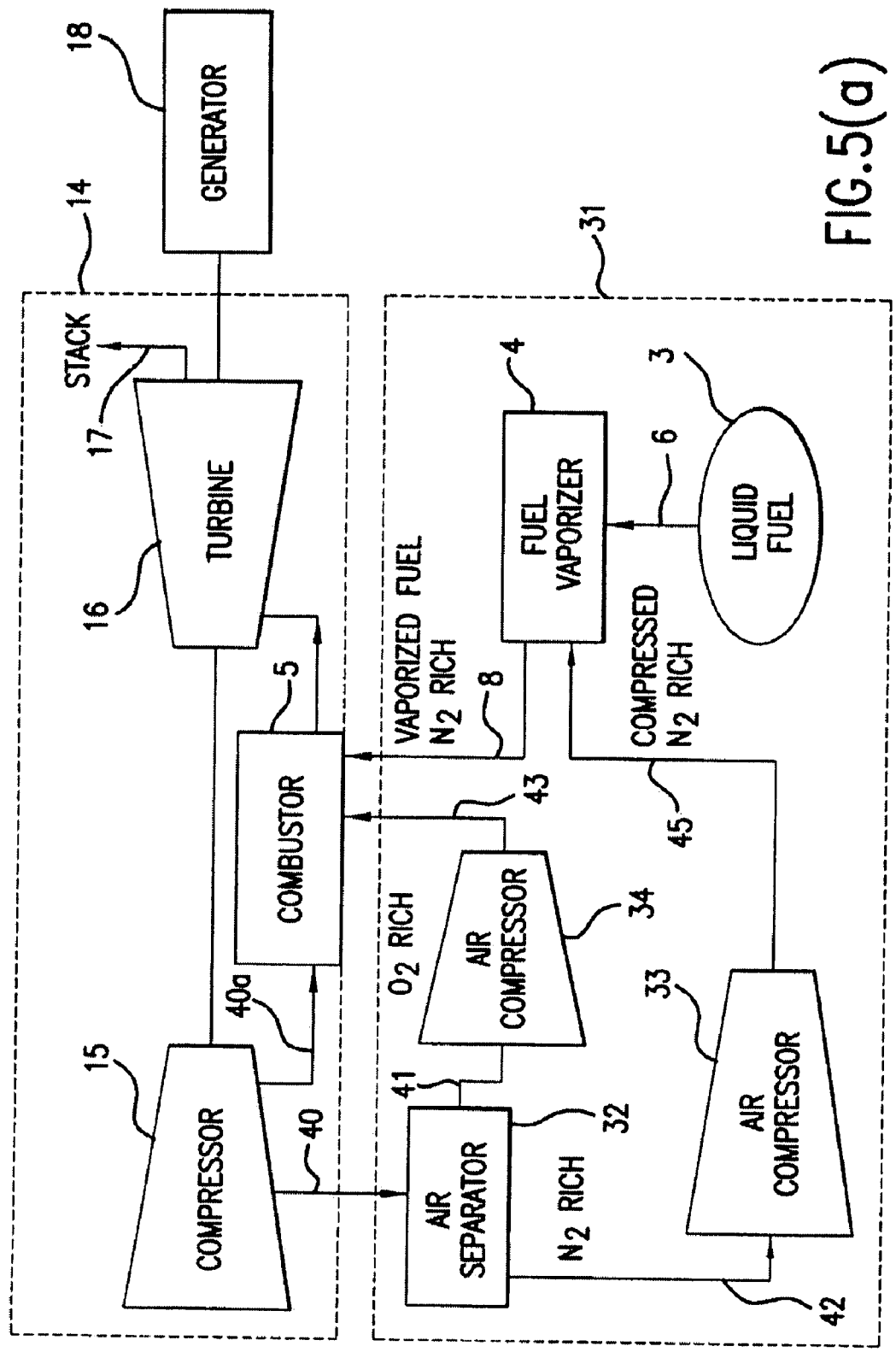
FIG. 5(a) is a block diagram of an example gas turbine engine with a liquid fuel or liquefied gas combustion device for use therewith, in accordance with an embodiment of the present invention.

FIG. 5a illustrates yet another embodiment a combustion system according to the present invention including a gas turbine engine 14 having a compressor 15, a combustor 5, a turbine 16, and a stack 17 for emission release. The turbine 16 can be coupled, for example, to a generator 18 or any other device, such as a naval vessel's screws. A liquid fuel/liquefied gas vaporization unit 31 of one embodiment of the present invention is connectable to the gas turbine engine 14. In the embodiment shown in FIG. 5a, the unit 31 includes an air separator 32, an auxiliary compressor 33, a second compressor 34, a fuel vaporizer 4, and a liquid fuel/liquefied gas source 3, which may be contained within the unit 31 or, alternatively, separate from and connected to the unit 31.

The air separator 32 intakes a compressed air stream from the compressor 15 of the engine 14 (or a compressed air stream from another source), and outputs an oxygen rich gas stream 41 and a reduced oxygen gas stream 42, which typically contains a high amount of nitrogen relative to air. A wide variety of air separators are known in the art. In some embodiments, the air separation unit produces the oxygen-rich and reduced oxygen streams 41, 42 using a process referred to as adsorption. In such embodiments, the air stream may be compressed to a pressure of three atmospheres to facilitate separation.

In the embodiment of FIG. 5a, the oxygen-rich stream 41 is compressed and the compressed oxygen-rich gas stream 43 is injected into the combustor 5. The oxygen-reduced stream 42 is fed to the auxiliary compressor 33, where it is pressurized. The resulting compressed oxygen-reduced gas stream 45 is then fed to the liquid fuel/liquefied gas vaporization unit 4. The liquid fuel/liquefied gas vaporization unit 4 mixes liquid fuel/liquefied gas feed 6 from a liquid fuel/liquefied gas source 3 with the compressed oxygen-reduced stream 45 at an elevated temperature to evaporate the liquid fuel/liquefied gas. The ratio at which the compressed oxygen-reduced stream 45 and gas feed 6 are mixed is dependent upon the liquid fuel 3 and the configuration of the engine 14. As discussed above, the ratio may be selected to allow an engine 14 that is configured to combust natural gas to be used with a higher hydrocarbon liquid fuel 3 without modification to the fuel distribution system of engine 14. The vaporization fuel/oxygen-reduced stream 8 is then fed to the combustor 5.

Figure 5B:
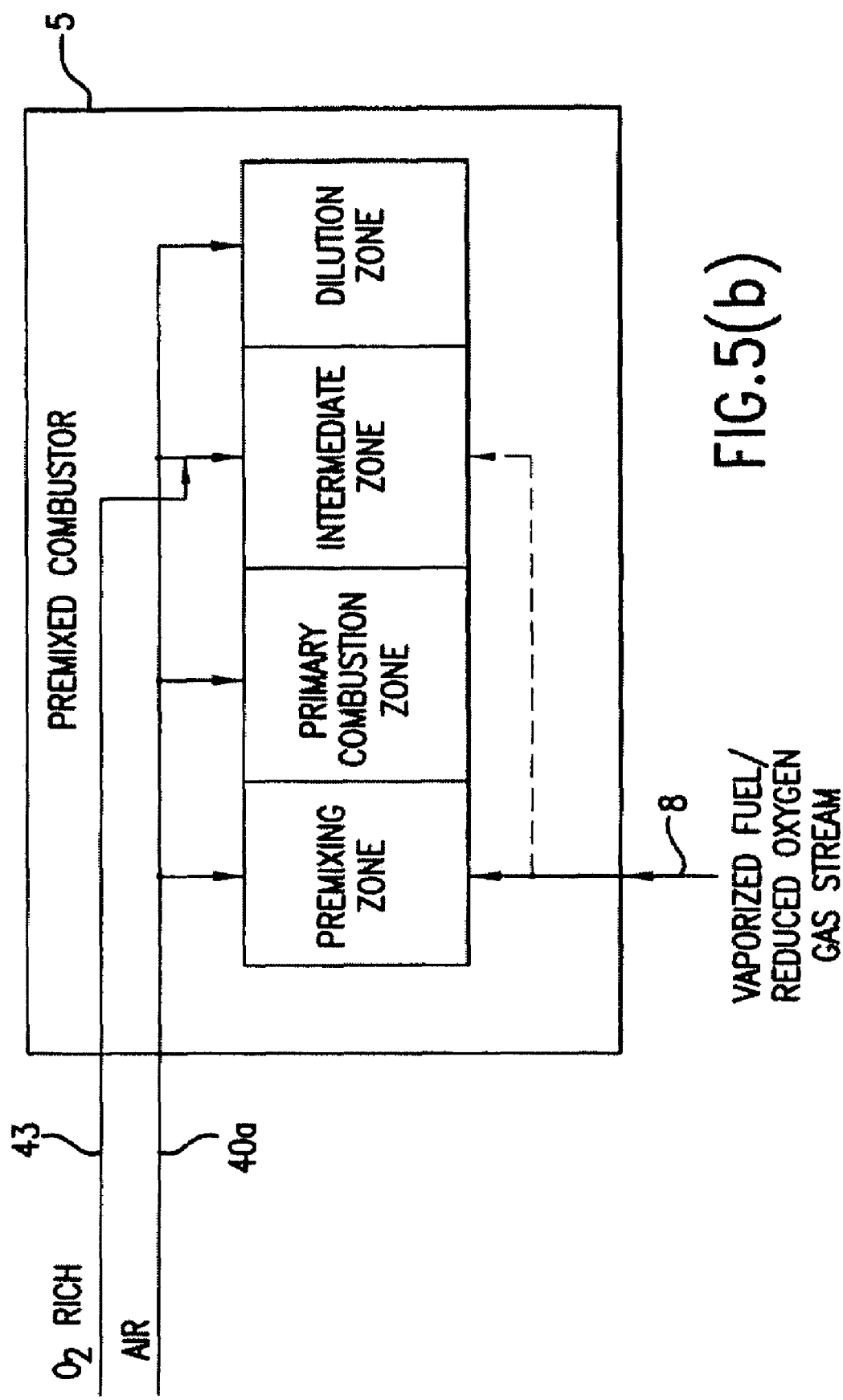
FIGS. 5(b), (c), (d) and (e) are block diagrams of various configurations of combustors of the gas turbine engine of FIG. 5(a)
Figure 5C:
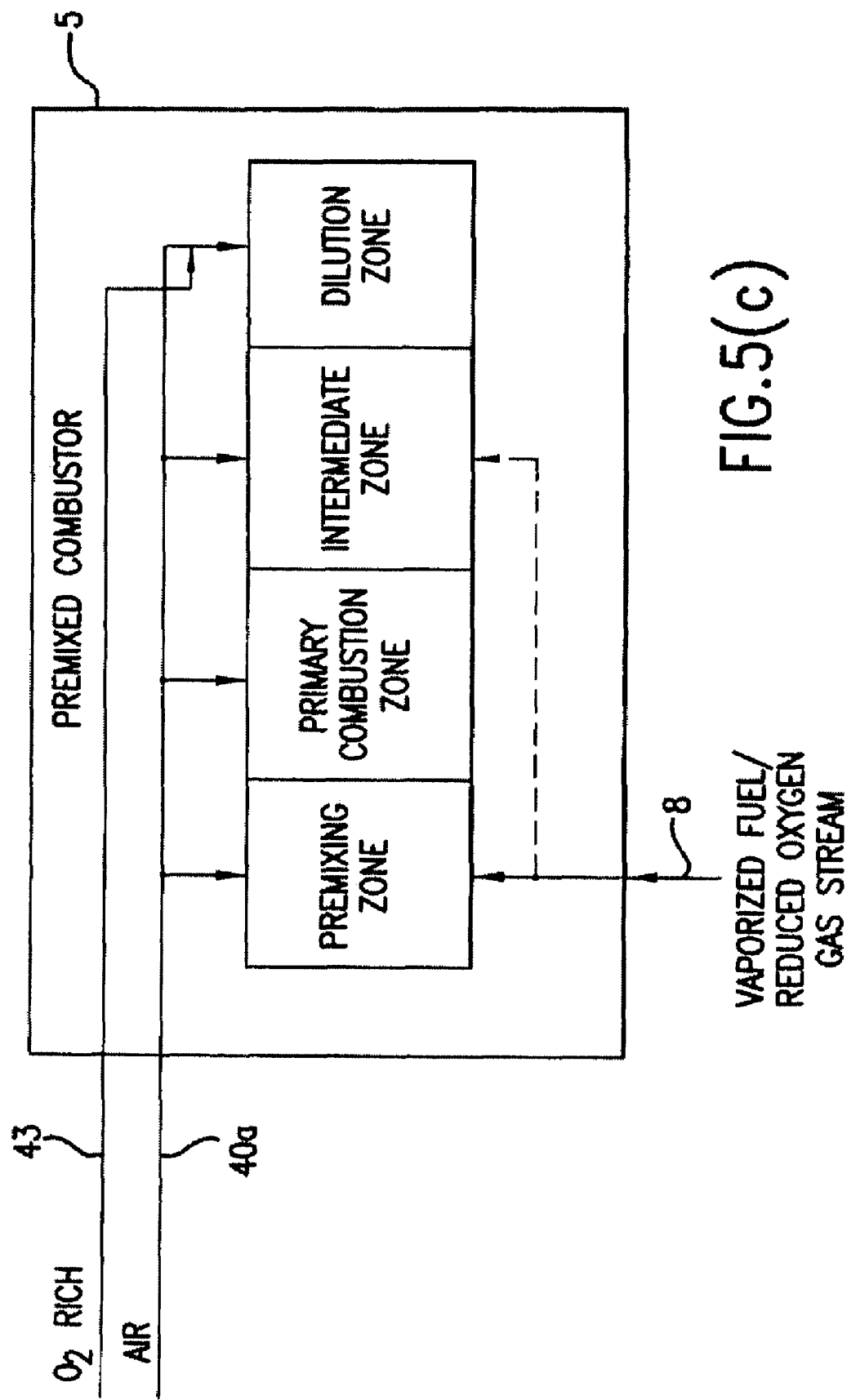
Figure 5D:
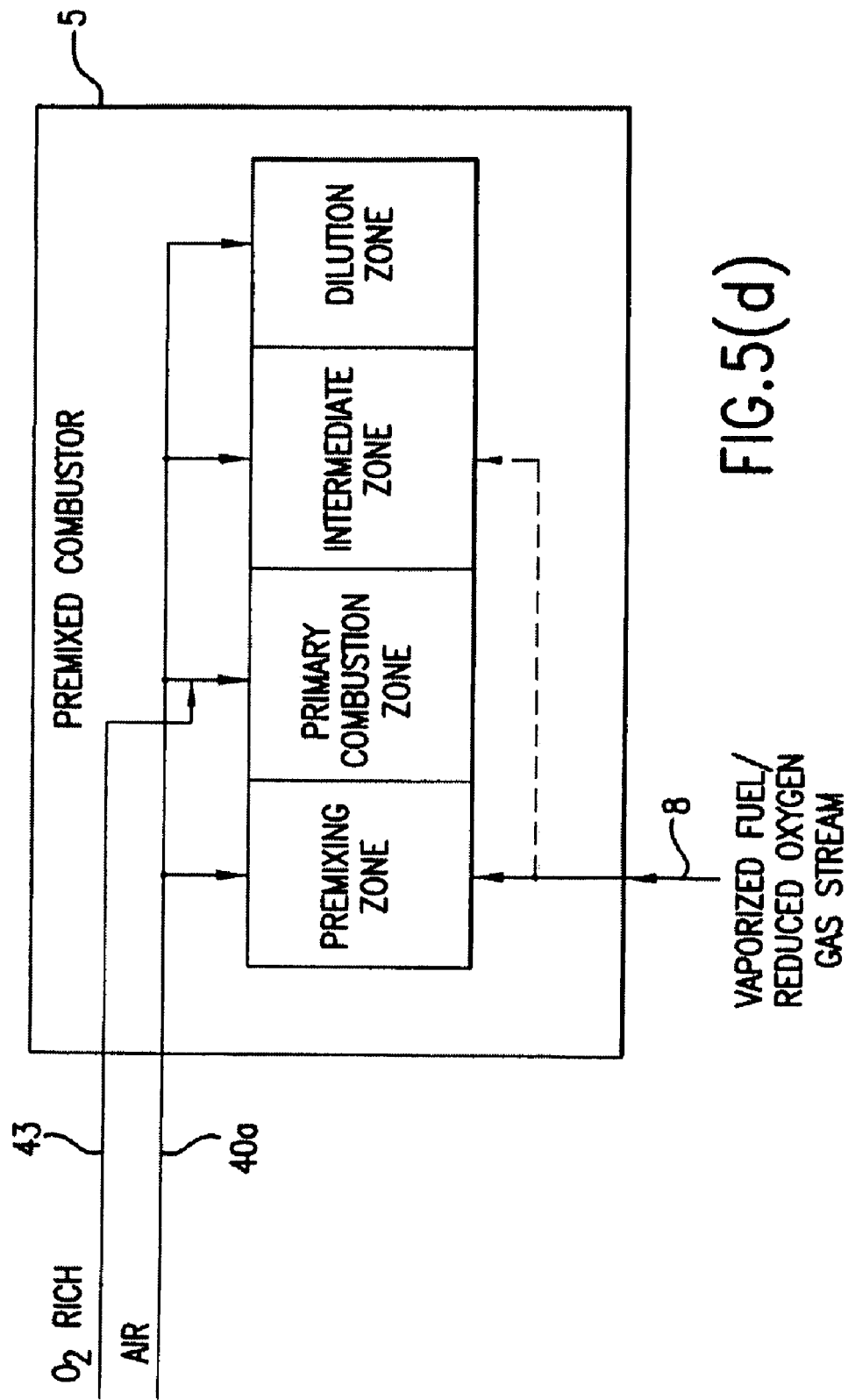
Figure 5E:
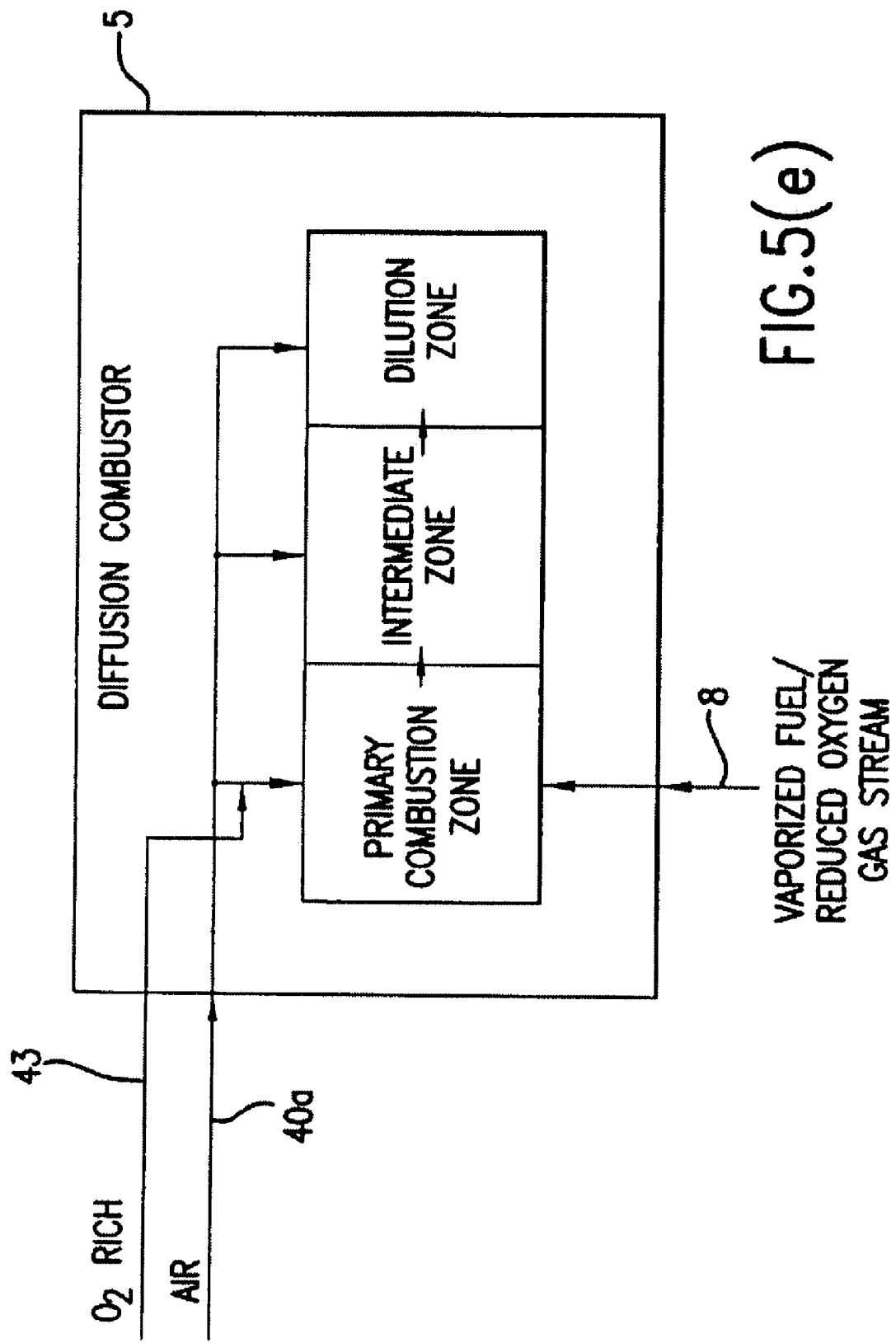
Figure 6:
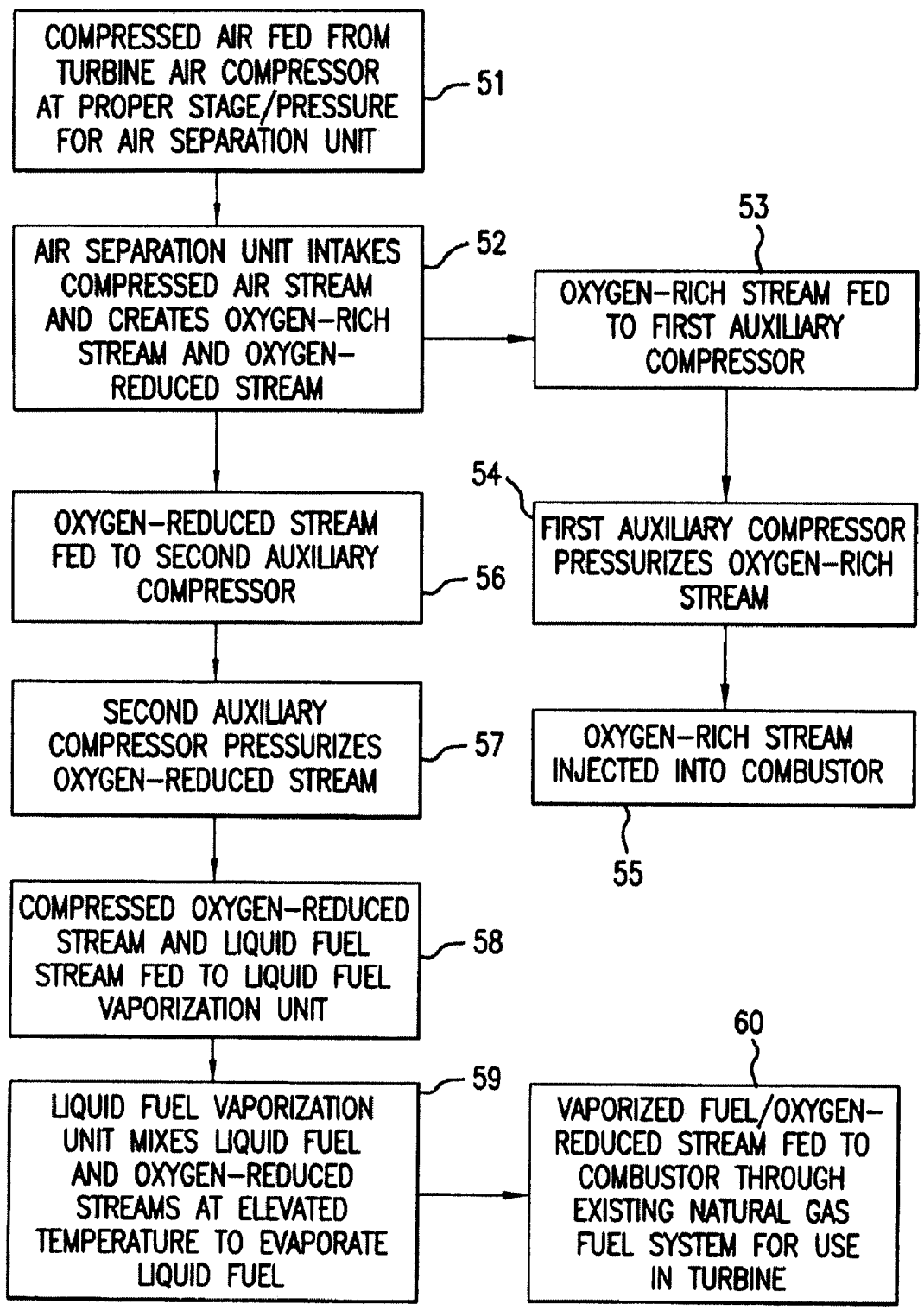
FIG. 6 shows a flow diagram of a method of using liquid fuels or liquefied gases with a gas turbine engine, in accordance with an embodiment of the present invention.

FIG. 6 shows a flow chart of a method of operation of a liquid fuel/liquefied gas vaporization system for use with a turbine, in accordance with an embodiment of the present invention. As shown in FIG. 6, compressed air is taken from the air compressor of the gas turbine engine at an appropriate stage/pressure for use in the air separation unit at step 51. The air separation unit takes the compressed air stream and creates an oxygen-rich stream and an oxygen-reduced stream at step 52. In one embodiment, the oxygen-rich stream is fed to a first auxiliary compressor at step 53, the first auxiliary compressor pressurizes the oxygen-rich stream at step 54, and the pressurized oxygen-rich stream is then injected into the combustor at step 55. In some embodiments, the oxygen rich fuel stream is injected into the combustor 5 downstream of the flame front (e.g., an intermediate zone or dilution zone of a combustor, such as a premixed combustor as shown in FIGS. 5(b) and 5(c), respectively, or a diffusion combustor) to reduce the amount of pollutants emitted by the engine 14. In other embodiments, the oxygen rich fuel stream is mixed with the combustion air from compressor 15 that is fed to the primary combustion zone of the combustor 5 as shown in FIG. 5(d) (premixed combustor) and FIG. 5(e) (diffusion combustor). This widens the operating range of the combustor, which allows combustion to occur at a lower equivalence ratio (i.e., leaner combustion), which can lower the emission of pollutants such as $NO_x$. In yet other embodiments, the oxygen rich fuel stream is simply mixed with the air from the compressor 15 and fed to all zones of the combustor.

The oxygen-reduced stream from the air separation unit is fed to a second auxiliary compressor at step 56, and the second auxiliary compressor pressurizes the oxygen-reduced stream at step 57. The resulting compressed oxygen-reduced stream, along with a liquid fuel/liquidized gas stream from a liquid fuel source, are then fed to the liquid fuel vaporization unit at step 58. The liquid fuel vaporization unit mixes the fed liquid fuel/liquidized gas stream with the compressed oxygen-reduced stream at an elevated temperature to evaporate the liquid fuel/liquidized gas at step 59. In an embodiment of the present invention, the degree to which the oxygen-reduced stream and the liquid fuel/liquidized gas are mixed is adjustable to specific heating value and/or mass or volumetric flow rate specifications as appropriate for various liquid fuels/liquefied gases. The vaporized fuel/oxygen-reduced stream is then fed to the combustor through, for example, the existing natural gas fuel system for use in the turbine at step 60.

Figure 7:
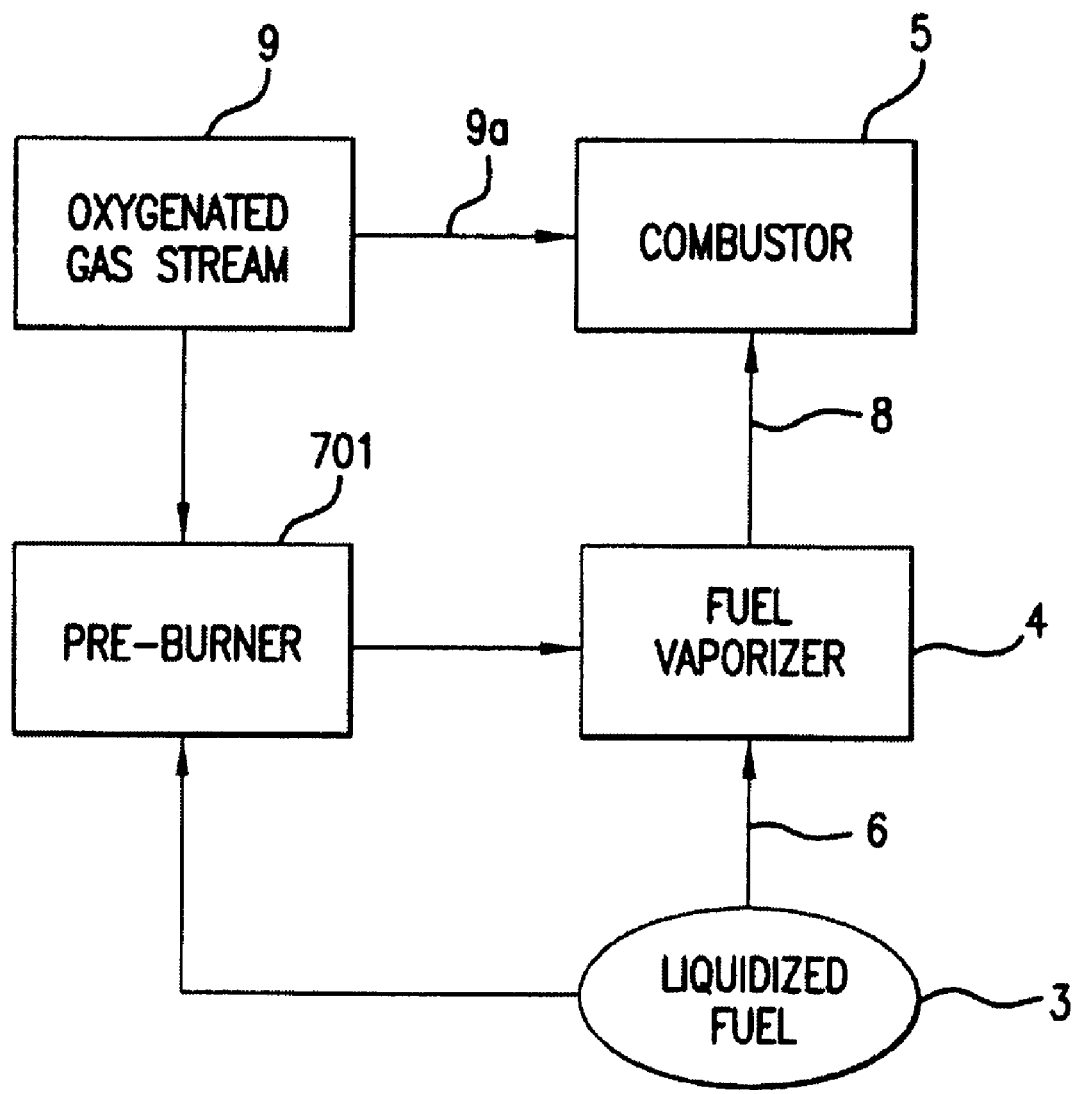
FIG. 7 shows a block diagram of a system employing a pre-burner to supply a reduced oxygen gas stream in accordance with another embodiment of the invention.

FIG. 7 illustrates an embodiment of the invention in which a fuel vaporizer 4 is supplied with a reduced oxygen gas stream from a pre-burner 701. The pre-burner 701 is supplied with air for combustion by the gas stream 9.

Figure 8:
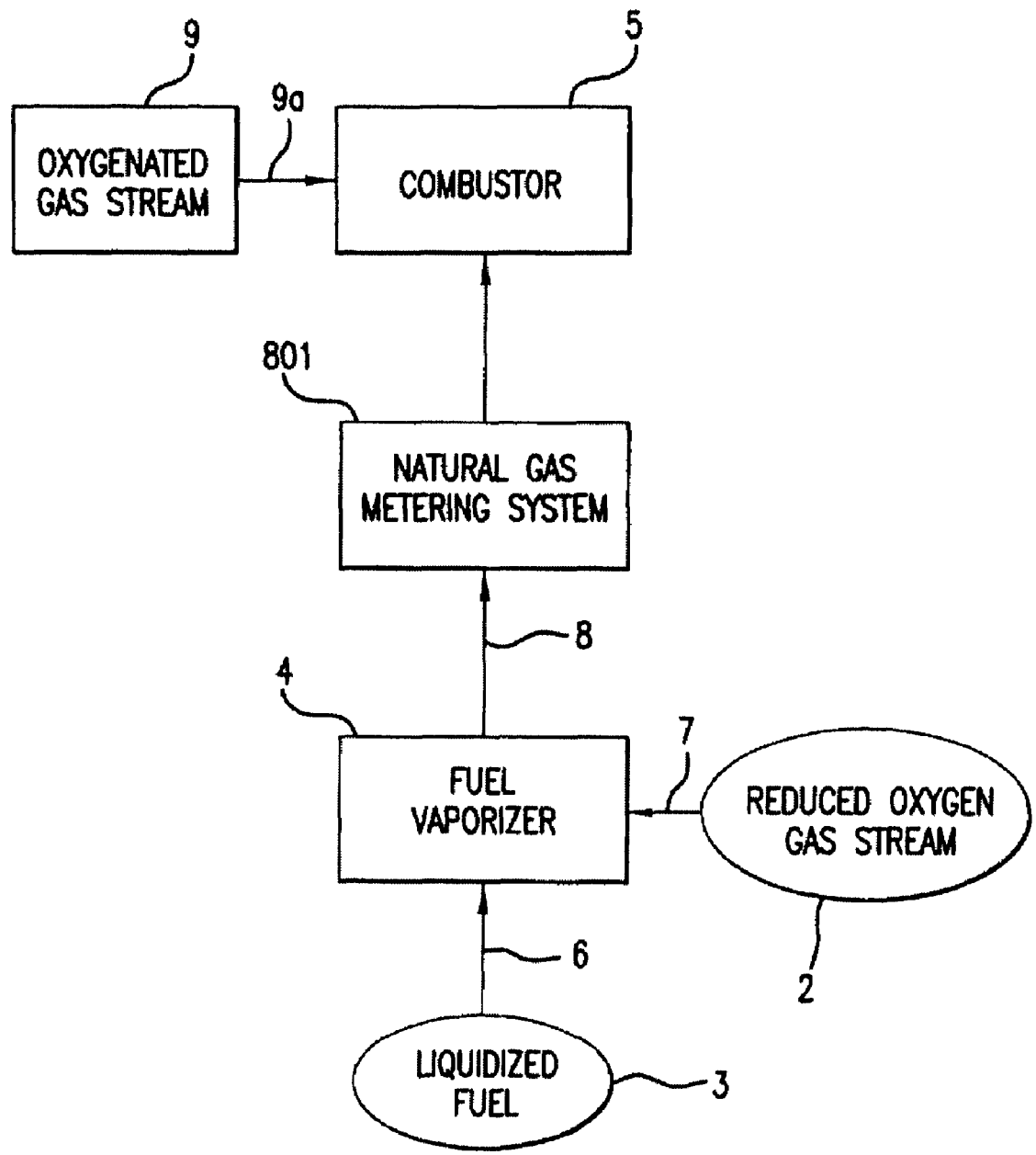
FIG. 8 shows a block diagram of a system with a natural gas fuel metering system in accordance with another embodiment of the invention.

As discussed above, some embodiments of the invention are configured to produce oxygen-reduced fuel gas streams from liquid fuels that can be fed to existing combustion devices such as gas turbine engines that are configured to combust other fuels such as natural gas without modification to the existing combustion devices. This is accomplished by mixing the fuel gas with an inert, reduced oxygen stream to keep the energy content of the fuel gas equal to that of natural gas on either a mass or volumetric basis depending upon the metering method used by the combustion device. For example, FIG. 8 illustrates another embodiment of the invention in which a combustor 5 is fed by a fuel metering system 801 that is configured for natural gas. In most existing combustion devices, fuel gas/combustion air ratio can be controlled such that the mixture may be made more or less lean. An additional benefit of the present invention is that many of the reduced oxygen vaporized higher hydrocarbon fuels can be burned at an equivalence ratio lower (leaner) than that of methane under the equivalent conditions (i.e., same temperature, same combustion air (or other oxygen containing gas) supply, etc.). For example, at atmospheric pressure the minimum equivalence ratio of methane is typically about 0.5 in air, while many higher hydrocarbons fuels can be combusted at an equivalence ratio of approximately 0.45 in air. The use of lower equivalence ratios reduces the emission of pollutants such as $NO_x$. As discussed above, the operating equivalence ratio of the combustion device may be even lower in embodiments in which the operating range has been widened through the addition of an oxygen rich stream from an air separator to the combustion air stream.

In other embodiments of the invention, a reduced oxygen fuel gas with a higher or lower energy content than that of natural gas is produced. In such embodiments, if a combustion device configured to run on natural gas is used, the fuel distribution/metering system of the combustion device may need to be appropriately modified.

Example embodiments of the present invention have now been described in accordance with the above advantages. It will be appreciated that these examples are merely illustrative of the invention. Many variations and modifications will be apparent to those skilled in the art.

What is claimed is:

1. A method for operating a combustion device, the method comprising the steps of:
   producing a fuel gas using a liquid fuel comprising hydrocarbon molecules and a diluent gas;
   premixing the fuel gas with a second gas containing oxygen to produce a gas mixture in a premixing zone located upstream of a combustion zone of a combustion device, the combustion device being configured such that autoignition of the gas mixture would occur upstream of the combustion zone in the absence of the diluent gas; and
   combusting the gas mixture in the combustion zone of the combustion device;
   wherein the diluent gas is inert and present in an amount such that reaction of the fuel gas upstream of the combustion zone is suppressed.

2. The method of claim 1, wherein the gas mixture has an amount of oxygen sufficient to support combustion of the gas mixture.

3. The method of claim 1, wherein the gas mixture is a lean mixture with an equivalence ratio less than 1.

4. The method of claim 1, wherein at least 50 weight percent of the hydrocarbon molecules of the liquid fuel have at least two carbon atoms.

5. The method of claim 1, wherein the oxygen content of the diluent gas is below a limiting oxygen index of the liquid fuel.

6. The method of claim 1, wherein the combustion device includes a fuel metering apparatus configured for natural gas.

7. The method of claim 1, wherein an equivalence ratio of the gas mixture is less than a minimum equivalence ratio at which methane could be combusted under equivalent operating conditions.

8. The method of claim 1, wherein the combustion device is a gas turbine engine.

9. The apparatus of claim 1, wherein the liquid fuel is a liquefied gas, the liquefied gas being of a composition that would be in a gaseous state at room temperature under atmospheric pressure.

10. A combustion apparatus comprising:
    a combustor, the combustor having a first inlet for accepting fuel gas, a second inlet for accepting oxygenated gas for supporting combustion of the fuel gas, a combustion zone, and a premixing zone upstream of the combustion zone, the combustion device being configured to premix the fuel gas with at least some of the oxygenated gas in the premixing zone to produce a gas mixture, and to combust the gas mixture in the combustion zone; and
    a fuel vaporization unit in fluid communication with the first inlet of the combustor, the fuel vaporization unit being configured to produce fuel gas using a liquid fuel comprising hydrocarbon molecules and a diluent gas;
    wherein the combustion apparatus is configured such that autoignition of the gas mixture would occur upstream of the combustion zone in the absence of the diluent gas and wherein the diluent gas is inert and present in the fuel gas in an amount such that reaction of the fuel gas upstream of the combustion zone is suppressed.

11. The combustion apparatus of claim 10, further comprising a fuel gas metering apparatus for controlling the supply of fuel gas to the first inlet, the fuel gas metering apparatus being configured for natural gas.

12. The apparatus of claim 10, wherein the combustion device is configured to combust the gas mixture at an equivalence ratio less than 1.

13. The apparatus of claim 10, wherein at least 50 weight percent of the hydrocarbon molecules of the liquid fuel have at least two carbon atoms.

14. The apparatus of claim 10, wherein an oxygen content of the diluent gas is below a limiting oxygen index of the liquid fuel.

15. The apparatus of claim 10, wherein an equivalence ratio of the gas mixture is less than a minimum equivalence ratio at which methane could be combusted under equivalent operating conditions.

16. The apparatus of claim 10, wherein the liquid fuel is a liquified gas, the liquified gas being of a composition that would be in a gaseous state at room temperature under atmospheric pressure.

17. The apparatus of claim 10, wherein the combustion device is a gas turbine engine.

18. The apparatus of claim 10, wherein the combustion device is configured such that an amount of the oxygenated gas sufficient to support combustion is premixed with the fuel gas in the premixing zone.

* * * * *

UNITED STATES PATENT AND TRADEMARK OFFICE
CERTIFICATE OF CORRECTION

| | |
|---|---|
| PATENT NO. | : 7,770,396 B2 |
| APPLICATION NO. | : 11/929675 |
| DATED | : August 10, 2010 |
| INVENTOR(S) | : Richard J. Roby et al. |

Page 1 of 1

It is certified that error appears in the above-identified patent and that said Letters Patent is hereby corrected as shown below:

Column 5, line 52 "stream 2", should read --stream 7--; and
Column 10, line 38 "apparatus", should read --method--.

Signed and Sealed this

Thirtieth Day of November, 2010

David J. Kappos
*Director of the United States Patent and Trademark Office*